US008466424B2

(12) United States Patent
Monnet et al.

(10) Patent No.: US 8,466,424 B2
(45) Date of Patent: Jun. 18, 2013

(54) DEVICE FOR DETECTING RADIATION WITH IMPROVED ARRANGEMENT

(75) Inventors: Olivier Monnet, Tullins (FR); Guillaume Montemont, Grenoble (FR)

(73) Assignee: Commissariat á l'énergie atomique et aux énergies alternatives, Paris (FR)

( * ) Notice: Subject to any disclaimer, the term of this patent is extended or adjusted under 35 U.S.C. 154(b) by 215 days.

(21) Appl. No.: 12/836,945

(22) Filed: Jul. 15, 2010

(65) Prior Publication Data
US 2011/0012023 A1    Jan. 20, 2011

(30) Foreign Application Priority Data

Jul. 16, 2009    (FR) ...................................... 09 54928

(51) Int. Cl.
*G01T 1/24*    (2006.01)

(52) U.S. Cl.
USPC ................................... 250/370.09

(58) Field of Classification Search
USPC ................................... 250/370.09
See application file for complete search history.

(56) References Cited

U.S. PATENT DOCUMENTS

| 3,529,161 | A  | * | 9/1970 | Kok et al. ................... 250/370.1 |
| 6,236,051 | B1 |   | 5/2001 | Yamakawa et al. |
| 6,700,948 | B2 | * | 3/2004 | Hoffman .......................... 378/19 |
| 7,247,860 | B2 | * | 7/2007 | Yanagita et al. ......... 250/370.09 |
| 2007/0003006 | A1 |   | 1/2007 | Tkaczyk et al. |
| 2007/0111358 | A1 |   | 5/2007 | Seino et al. |
| 2010/0200761 | A1 | * | 8/2010 | Yu et al. .................... 250/370.09 |

FOREIGN PATENT DOCUMENTS

| EP | 1 762 863 A2 | 3/2007 |
| EP | 1 798 574 A1 | 6/2007 |
| JP | 11-304930 | 11/1999 |
| JP | 2003-84068 | 3/2003 |
| WO | WO 2008/059425 A2 | 5/2008 |
| WO | WO 2008-059425 A3 | 5/2008 |

OTHER PUBLICATIONS

John R. Macri, et al., "Readout and Performance of Thick CZT Strip Detectors with Orthogonal Coplanar Anodes", Nuclear Science Symposium Conference Record, 2002 IEEE, vol. 1, Nov. 10-16, 2002, pp. 468-472.
Arnaud Drezet, et al., "CdZnTe Detectors for the Positron Emission Tomographic Imaging of Small Animals", Nuclear Science Symposium Conference Record, 2004 IEEE, vol. 7, (IEEE CAT. No. 04CH37604), XP010819707, Oct. 16, 2004, pp. 4564-4568.
French Search Report issued on Mar. 26, 2010.

\* cited by examiner

*Primary Examiner* — Constantine Hannaher
(74) *Attorney, Agent, or Firm* — Oblon, Spivak, McClelland, Maier & Neustadt, L.L.P.

(57) ABSTRACT

A device that detects electromagnetic radiation, including an assembly of juxtaposed parallelepipedic semiconductor detection blocks, each detection block including a given length separating a detection face and at least one rear face opposite to the said detection face, a given thickness separating a first polarization face with one or more electrodes and a second polarization face with one or more other electrodes, and a given width.

15 Claims, 10 Drawing Sheets

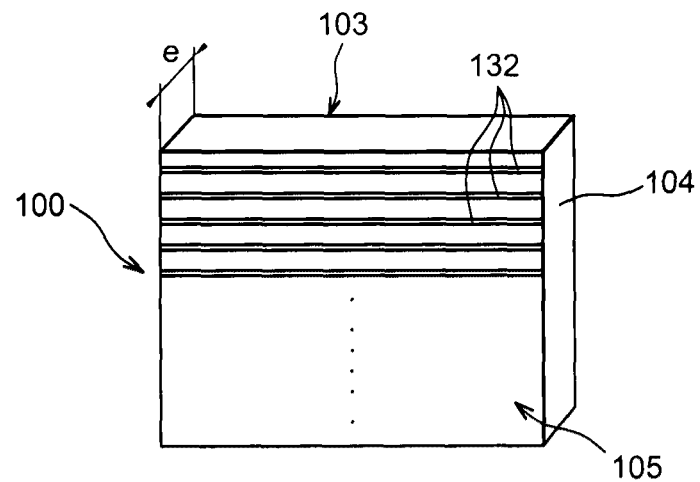
FIG. 3A
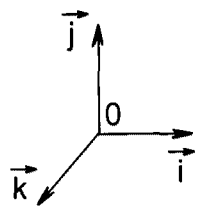
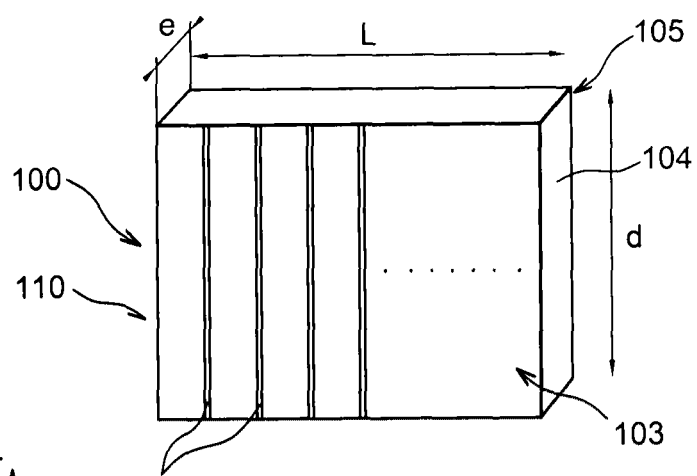
FIG. 3B
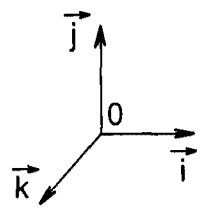

DEVICE FOR DETECTING RADIATION WITH IMPROVED ARRANGEMENT

TECHNICAL FIELD

This invention relates to the technical field of semiconductor detectors of electromagnetic radiation, in particular ionizing radiation, such as X or gamma radiation detectors.

It relates to the implementation of a device for detecting radiation consisting of an assembly of juxtaposed or stacked detectors, the arrangement of which provides a reduction of the dead zone of detection and of congestion of the assembly. Thus, the invention provides improvements in terms of detection efficiency and has applications in fields such as medical imaging, tomography.

PRIOR ART

A detecting device of ionizing radiation such as a detector of X or gamma rays, may comprise an assembly of parallelepipedic detection semiconductor blocks.

An example of a detection block 100 is given in FIG. 1.

This detection block 100 may have a length L (defined in a direction $\vec{i}$ of an orthogonal coordinate system [O; $\vec{i}$; $\vec{j}$; $\vec{k}$]) which may be of the order, for example, of several tens of millimetres, and which is defined between one of its faces called "detection face" 102, exposed to a radiation R, for example X or gamma radiation, and another face 104, called "back face" and which is opposite to the said detecting face 102. The detection semiconductor block 100 may also have a thickness e (defined in a direction $\vec{k}$ of an orthogonal coordinate system [O; $\vec{i}$; $\vec{j}$; $\vec{k}$]) comprised for example, between several hundreds of micrometres and several millimetres separating a first face 103 so-called "of polarization" and a second face called "of polarization" 105 opposite and parallel to the first polarization face 103. The polarization faces 103, 105 of the detection block 100 are faces having electrodes polarized in such a way so that the semiconductor block is subjected to an electric field between the polarization faces.

In FIG. 2, is shown a radiation detector element according to the prior art. It comprises on each polarization face of a detection block 100, an electrode in the form of conductive areas 112 extending over the entire surface of the polarization faces of this detection block 100.

In each semiconductor detection element, the electrical charges generated by interaction between a radiation and the semiconductor material, are intended to be converted into electrical signals and recovered at the electrodes.

Thus, an electrode of a first type, such as an anode, is arranged on a first polarization face 103 of a semiconductor detection block 100, and an electrode of a second type, such as a cathode is formed on a second polarization face 105 of the semiconductor detector block 100.

Applying a voltage between electrodes located on opposite polarization faces of a detection block allows extracting detection electrical signals.

Thickness e separating the polarization faces of a detector block 100 of ionizing radiation is limited because of the charge transport properties of the materials currently being used.

It is usually tried to associate a large number of detector elements by stacking them or by juxtaposing them with each other, in order to have a large detection volume, thereby allowing high detection efficiency.

An ionizing radiation detector device according to the prior art, comprising an assembly of juxtaposed semiconductor blocks is given, for example, in document U.S. Pat. No. 6,236,051.

In such a device, the arrangement is provided so that two adjacent detector semiconductor blocks share a common cathode, or a common anode, and are assembled through the use of a conductive adhesive.

Document EP 1 762 863 A2, discloses a device for detecting ionizing radiation with a similar arrangement.

Document "CdZnTe detectors for the positron emission tomographic imaging of small animals"; Drezet, A. Monnet, O. Montemont, G. Rustique, J. Sanchez, G. Verger, Nuclear Science Symposium Conference Record, 2004 IEEE, Publication Date: 16 to 22 Oct. 2004, Volume: 7, On page(s): 4564-4568, Vol. 7, E-ISBN: 0-7803-8701-5, Number of Pages: 7 vol., discloses another device for detecting ionizing radiation according to the prior art.

Another device for detecting ionizing radiation according to the prior art is given in document: "Readout and performance of thick CZT strip detectors with orthogonal coplanar anodes"; Macri, J. R. Donmez, B. Hamel, L-A. Julien, M. McClish, M. McConnell, M. L. Miller, R. S. Ryan, J. M. Widholm, M.; Space Sci. Center, New Hampshire Univ., Durham, N.H., USA; Nuclear Science Symposium Conference Record, 2002 IEEE, Publication Date: 10 to 16 Nov. 2002, Volume: 1, On page(s): 468-472 vol. 1, Number of Pages: 3 vol.

A problem is raised of achieving a new radiation detector device having juxtaposed detection blocks, which has improvements in terms of reducing the detection dead zones.

DESCRIPTION OF THE INVENTION

The invention relates to a device for detecting electromagnetic radiation, in particular ionizing radiation, consisting of an assembly of juxtaposed parallelepipedic semiconductor detection blocks, each detection block having: a given length separating a detection face and at least one rear face opposite to the said detection face, a given thickness separating a first polarization face with one or more electrodes and a second polarization face with one or more electrodes, and a given width, the assembly being such that it has a first detection block and a second detection block which are adjacent, a first polarization face of the second detection block being located opposite to a first polarization face of the first detection block.

Preferably, the first polarization face of the second detection block has electrodes of the same kind as those of the first polarization face of the first detection block. By electrode of the same kind one means that they are intended to be brought to the same potential.

According to a first aspect of the invention, the first detection block is provided with a length other than that of the second detection block or a width other than that of the second detection block.

Thus, when the first detection block and the second detection block have their respective detection faces substantially in the same plane, the first polarization face of the longest or widest block goes beyond that of the other block, which may make it possible to access to one or several electrodes located on an area of the first polarization face which is beyond, and to provide a connection with a polarization circuit in this area.

According to one possible implementation, the detection blocks may comprise, on a first polarization face, electrodes which are parallel to each other and directed according to a first direction, and on a second polarization face, electrodes which are parallel to each other and directed according to a second direction, orthogonal to the first direction. Such an arrangement allows to implement a matrix organization of electrodes in order to form a matrix of pixels, or when several detection blocks are arranged, a 3D matrix of voxels.

The electrodes located on the first polarization face of the first detection block may have the same direction as the electrodes of the said first polarization face of the second detection block.

According to one possibility, at least one electrode located on the first polarization face of the first block can be connected electrically to at least one electrode located on the first polarization face of the second block. This may make it possible to provide a single circuit dedicated to the polarization of electrodes and to the detection of signals, said single circuit being connected to two different detection blocks. Preferably, this electric connection is carried out by means of a conductive layer.

The first detection block may have a length greater than that of the second detection block. This may allow providing to establish an electrical contact with a polarization and signal detection circuit on the longest detection block.

The first detection block may have a width less than that of the second detection block. This may allow providing to establish an electrical contact with another polarization and signal detection circuit on the widest detection block.

The electrodes of the first polarization face of the second detection block and of the first polarization face of the first detection block, may be intended to be brought to a first potential, while the electrodes of the second polarization face of the second detection block and of the second polarization face of the first detection block, are intended to be brought to a second potential, different from the first potential. Thus, one may have an assembly wherein anodes are placed opposite to anodes, while cathodes are placed opposite to cathodes.

According to one possibility, the assembly and electrical connection between two adjacent detection blocks may be achieved through an anisotropic conductive adhesive layer interposed between these two detection blocks.

According to another possibility, the assembly and electrical connection between two adjacent detection blocks may be achieved through a conductive adhesive or conductive adhesive points. In this case, the conductive adhesive may be deposited, for example by screen printing.

The detection device according to the invention may also comprise means for polarizing the electrodes and for processing signals issued by the electrodes.

In particular, the device may also comprise at least one support assembled to the first detection block and equipped with means for polarizing electrodes and/or means for processing signals from electrodes, the polarization and/or signal processing means being electrically connected to at least one electrode of the first detection block.

According to a method of assembling and connecting which is possible between detection blocks, the first support may be arranged between the first detection block and the second detection block and comprise at least one opening, through which an electrical connection between at least one electrode of the first detection block and at least one electrode of the second detection block is established by using at least one conductor element crossing the said opening. This conductor element can be, for example, a drop of conductive adhesive. The first support may also be connected electrically to at least one electrode of the first detection block or to at least one electrode of the second detection block.

The assembly of detection blocks can be such that it has at least a third detection block adjacent to the first detection block, the second polarization face of the first detection block being located opposite to the second polarization face of the third detection block, at least one electrode located on the second polarization face of the first block being connected electrically to at least one electrode located on the second polarization face of the third detection block.

According to one possibility, the first detection block may have a longer length than that of the third detection block and/or a lower width than that of the third detection block.

The device can then also comprise at least a second support equipped with polarization means of electrodes and/or means for processing signals issued from electrodes, the means of polarization and/or signal processing being connected electrically to at least one electrode of the first detection block and/or of the third detection block.

The second support may be arranged between the first detection block and the third detection block and comprises at least one opening provided so that an electrical connection between at least one electrode of the first detection block and at least one electrode of the second detection block may be established, the second support being also connected electrically to at least one electrode of the first detection block or to at least one electrode of the second detection block.

This electrical connection may be established by using a conductive adhesive.

According to a second aspect, the invention relates to a device for detecting electromagnetic radiation, in particular ionizing radiation, consisting of an assembly of juxtaposed parallelepipedic semiconductor detection blocks, each detection block having: a given length separating a detection face and at least a rear face opposite to the said detection face, a given thickness separating a first polarization face comprising one or more electrodes and a second polarization face comprising one or more other electrodes, and a given width, the assembly being such that it comprises:
a first detection block and a second detection block which are adjacent, a first polarization face of the second detection block being located opposite of a first polarization face of the first detection block,
a first support equipped with polarization and/or signal processing means connected electrically to at least one electrode of the first detection block or to at least one electrode of the second detection block, the first support being arranged between the first detection block and the second detection block and having at least one opening, an electrical connection between at least one electrode of the first detection block and at least one electrode of the second detection block being established by using at least a conductor element crossing the said opening.

For one or the other aspects of the invention, the detection blocks may be made from a semiconductor material selected among one of the following materials: CdTe or CdZnTe or Si, or GaAs.

The radiation detected by a device according to the invention can be an X or gamma radiation.

Moreover, the invention relates to a medical imaging device comprising a detector device as defined above.

BRIEF DESCRIPTION OF THE DRAWINGS

This invention will be better understood by reading the description of embodiments given purely by way of example and not at all limiting, by making reference to the accompanying drawings wherein:

FIGS. 3A to 3B show an example of a radiation detector element comprising a plurality of elongated parallel electrodes distributed on one face of a parallelepipedic detection block made from a semiconductor material and directed in the direction of the length of the detection block, and a plurality of elongated parallel electrodes distributed on an opposite face of the detection block and directed in the direction of the width of the detection block.

To make the figures more legible, the different parts shown in the Figures are not necessarily in a uniform scale.

DETAILED DESCRIPTION OF PARTICULAR EMBODIMENTS

On FIGS. 3A and 3B is given an example of electromagnetic detection element, in particular ionizing radiation.

Figure 1:
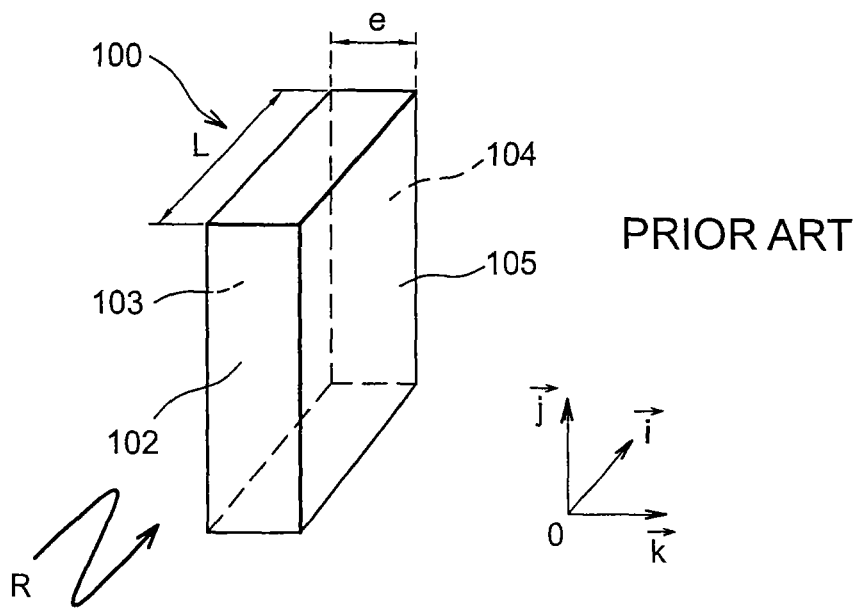
FIG. 1 gives an example of a parallelepipedic detection block made from a semiconductor material, embedded in a device for detecting ionizing radiation.
Figure 2:
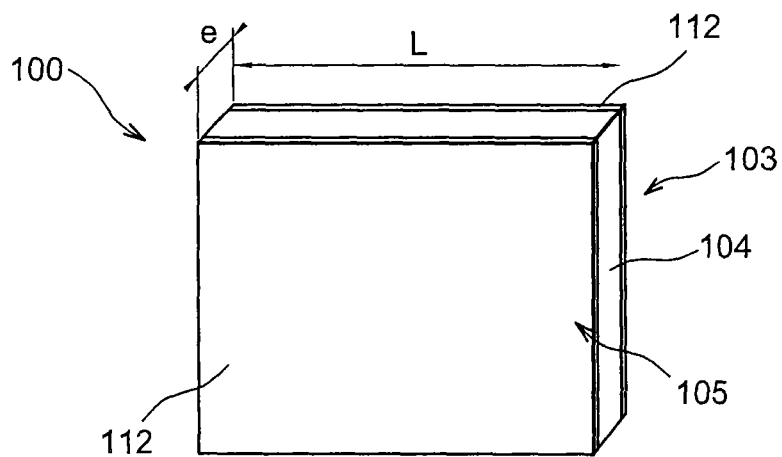
FIG. 2 shows an example of ionizing radiation detector element according to the prior art.
Figure 2:
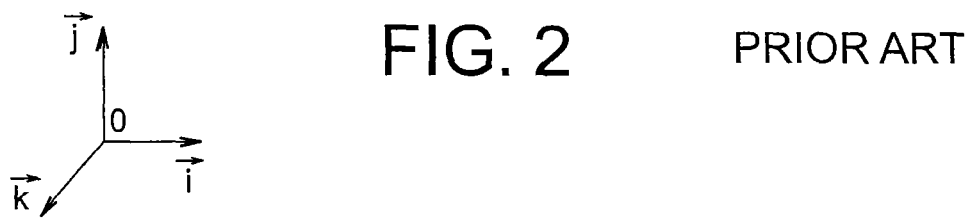

The detection element comprises a parallelepipedic semiconductor detection block such as that, for example described previously in connection with FIG. 1, and can be equipped, for example, with a plurality of electrodes arranged on each one of the polarization faces 103, 105 of the detection block 100.

The electrodes may be in the form of lines or paths, or strips, where are elongated, conductive, parallel to each other, and made from a metallic material such as gold or platinum.

The detecting element (or block) may comprise parallel electrodes 122, which extend in the direction of width d (measured in a direction $\vec{j}$ of an orthogonal coordinate system [O; $\vec{i}$; $\vec{j}$; $\vec{k}$]) on the first polarization face 103 of the detection block 100. The first polarization face 103 of the detection block 100 may comprise m electrodes. According to an example, m may be equal to 8.

On the second polarization face 105, the electrodes can also be parallel and extend in the direction of length L (measured in a direction $\vec{i}$ of an orthogonal coordinate system [O; $\vec{i}$; $\vec{j}$; $\vec{k}$]) of the detection block 100. The second polarization face of the detection block 100 may comprise n electrodes with n which may, according to an example, be equal to 16.

Figure 4:
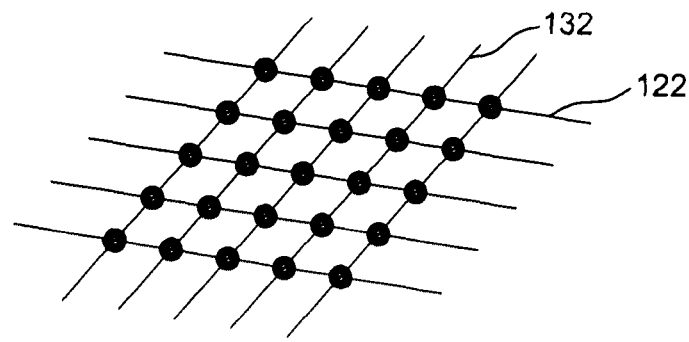
FIG. 4 shows a matrix of pixels or of voxels formed by the arrangement of electrodes on each side of a semiconductor detection block in a radiation device according to the invention.
Figure 5:
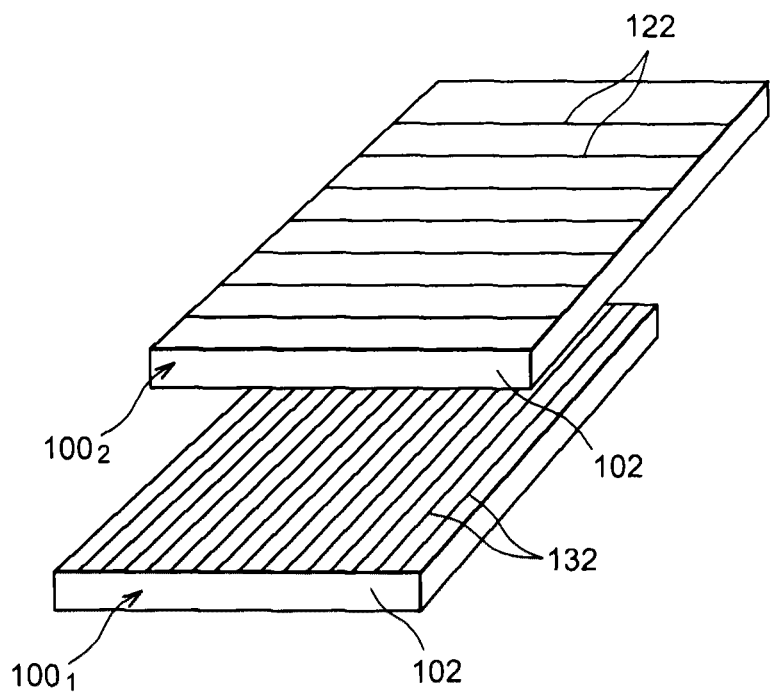
FIG. 5 shows an example of arrangement of electrodes on two neighbouring detection blocks in a radiation detector device according to the invention.

Thus, the distribution of electrodes 122 and 132 on each side of a detection block 100 may be such that when projected onto the same plane parallel to the polarization faces of the detection block, the electrodes 122 located on a polarization face of the semiconductor block 100 and the electrodes 132 located on the other polarization face of this detection block 100, are orthogonal to each other and form a matrix or grid, the intersections of which correspond to pixels or voxels of a matrix of pixels or voxels (FIG. 4).

The material from which the detection block 100 is formed may be a semiconductor material, for example a semiconductor being capable of operating at room temperature, such as CdTe, or CdZnTe, or Si, or GaAs.

Interactions can be located in a detection block by setting in coincidence a signal from one of the electrodes (anode or cathode) located on a polarization face of the detection block and a signal from one of the electrodes (cathode or anode) among those located on the other polarization face. By detection block, one thus means a detector as described above.

A radiation detector device according to the invention comprises several detector elements, or detection blocks, which are juxtaposed or stacked.

According to one example, in a case where the device has 16 juxtaposed blocks of the type as described in connection to FIGS. 3A and 3B, and wherein each block has 8 electrodes on one face and 16 electrodes on another face, a detection device with 16*8*16=2,048 voxels can be implemented.

A radiation detection device according to the invention can comprise a plurality of detection elements of the type of that just described.

These detection elements can be arranged so that one polarization face of a first detection block $100_1$ comprising electrodes 122, intended to be brought to a given potential and acting, for example the role of anodes, is located opposite a polarization face of a second block $100_2$, adjacent to and having electrodes 122, intended to be brought to the same given potential and thus also acting the role of anodes. In this case, the detection elements are positioned in such a way so that one polarization face of the second detection block $100_2$ having electrodes 132, intended to be brought to another potential, different from the given potential, and acting, for example the role of cathodes, may be located opposite to a detection face of a block $100_3$ having electrodes 132, also intended to be brought to the said other given potential and acting as cathodes.

Such a configuration, wherein anodes of a first detection block $100_1$, are located opposite to anodes of a second detection block $100_2$ adjacent to the second detection block $100_2$, and cathodes of the second detection block $100_2$ are located opposite of cathodes of a third detection block $100_3$, adjacent to the second block $100_2$, may make it possible to polarize electrodes of the same kind, placed on adjacent detection blocks, by using the same polarization circuit or the same polarization means or polarization means located on the same support, for example a support of the board or printed circuit type.

By electrodes of the same kind, one means electrodes which are intended to be polarized to the same potential. For example, they can be anodes of two adjacent detection blocks or cathodes of two adjacent detection blocks.

Such a configuration may also allow to obtain a reduced dead area with respect to another configuration (not shown) wherein anodes of a detection block are located opposite to cathodes of an adjacent detection block and wherein an isolation of these cathodes and anodes of adjacent blocks is provided and increases the distance between the adjacent blocks, and hence the dead area of the detector.

With such a configuration, reducing the dead area to the extent of several millimetres can be obtained for example for a stack of 16, 1 mm detection blocks.

According to this configuration, two electrodes of the same kind, belonging to two adjacent detection blocks, are in contact with each other, the contact being made via a conductive material such as a conductive adhesive.

Figure 6A:
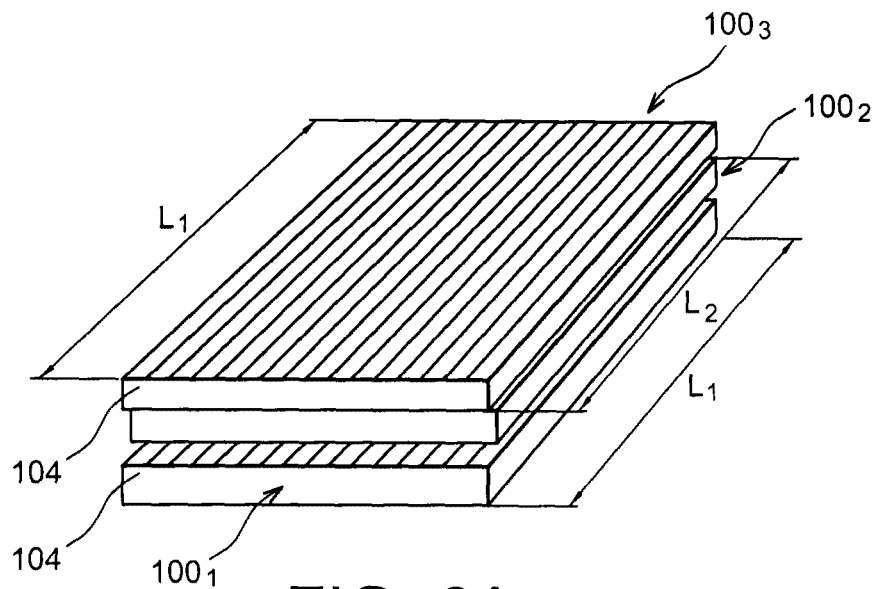
FIGS. 6A, 6B show an example of an arrangement in a radiation detector device according to the invention, having neighbouring detection blocks of different lengths.

In FIG. 6A is shown an implementation of a detection device with adjacent detection blocks $100_1$, $100_2$, $100_3$, having different respective lengths. The first block $100_1$ has a length $L_1$ greater than that of the second block $100_2$, adjacent to the first block $100_1$ and having a length $L_2$. An assembly comprising blocks having a first length $L_1$ alternating with blocks of a second length $L_2$ such as $L_2<L_1$ may thus be achieved.

In this case, when the respective detection faces 102 of adjacent blocks $100_1$, $100_2$, $100_3$, are substantially coplanar or located in a same plane, the rear faces 104 of the blocks $100_1$, $100_3$, having a greater length $L_1$, go beyond those of block $100_2$ having a lesser length $L_2$.

Using this excess, when the blocks $100_1$, $100_2$, $100_3$, are assembled, part of the polarization faces of blocks $100_1$, $100_2$, of greater length $L_1$ goes beyond, thereby allowing to have an access to the electrodes 132, near the rear face 104 of the detection blocks $100_1$, and $100_3$.

Figure 6B:
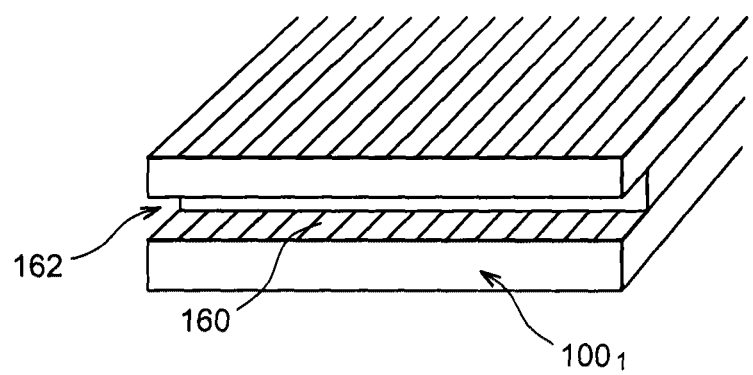

Thus, a contact area 160 for means for polarizing the electrodes 132 or/and for means for processing signals generated at these electrodes 132, may be achieved (FIG. 6B).

Alternation of blocks $100_1$, $100_2$, $100_3$, of different lengths, forms near the rear faces 104 of the respective detection blocks $100_1$, $100_2$, $100_3$, housings 162 between two blocks $100_1$, and $100_3$. In each of these housings 162, may be inserted a support with means for polarizing the electrodes (such a support not being shown in FIG. 6B). Such a support belongs to the detection device but should not be considered as belonging to a detection block: the latter is limited to the detection material and to the electrodes deposited on said material.

Figure 7A:
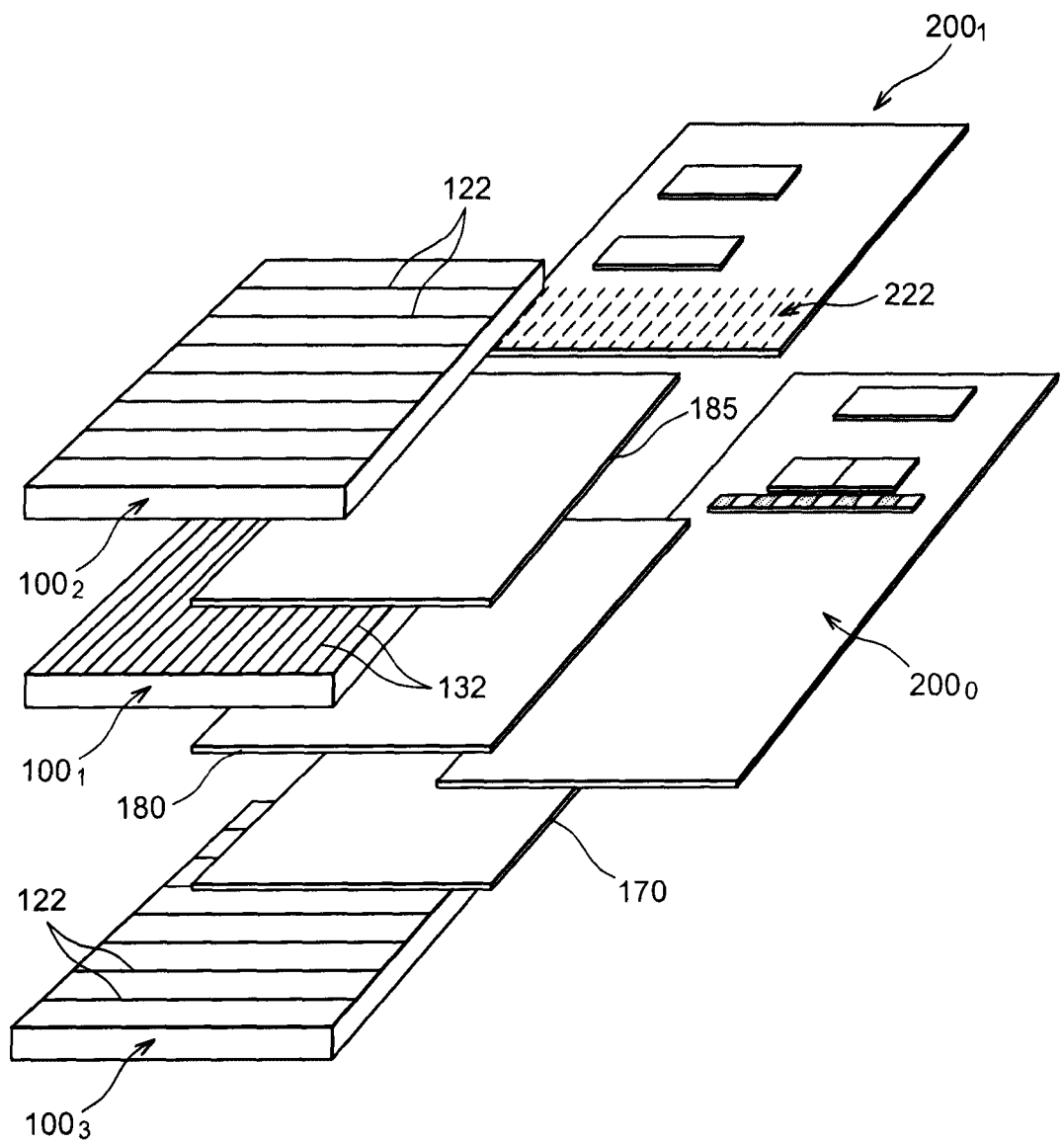
FIGS. 7A to 7C show an example of an assembly in a radiation detector device according to the invention, of detection blocks with polarization and signal processing circuits.
Figure 7B:
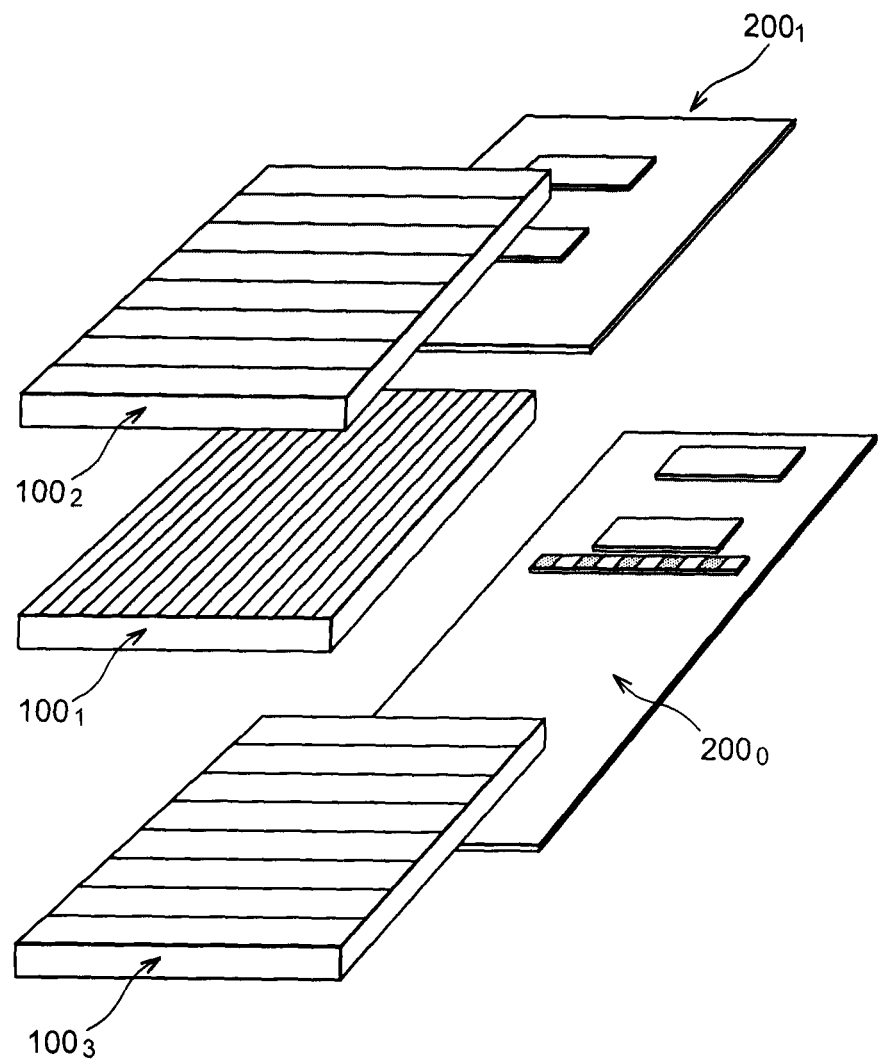
Figure 7C:
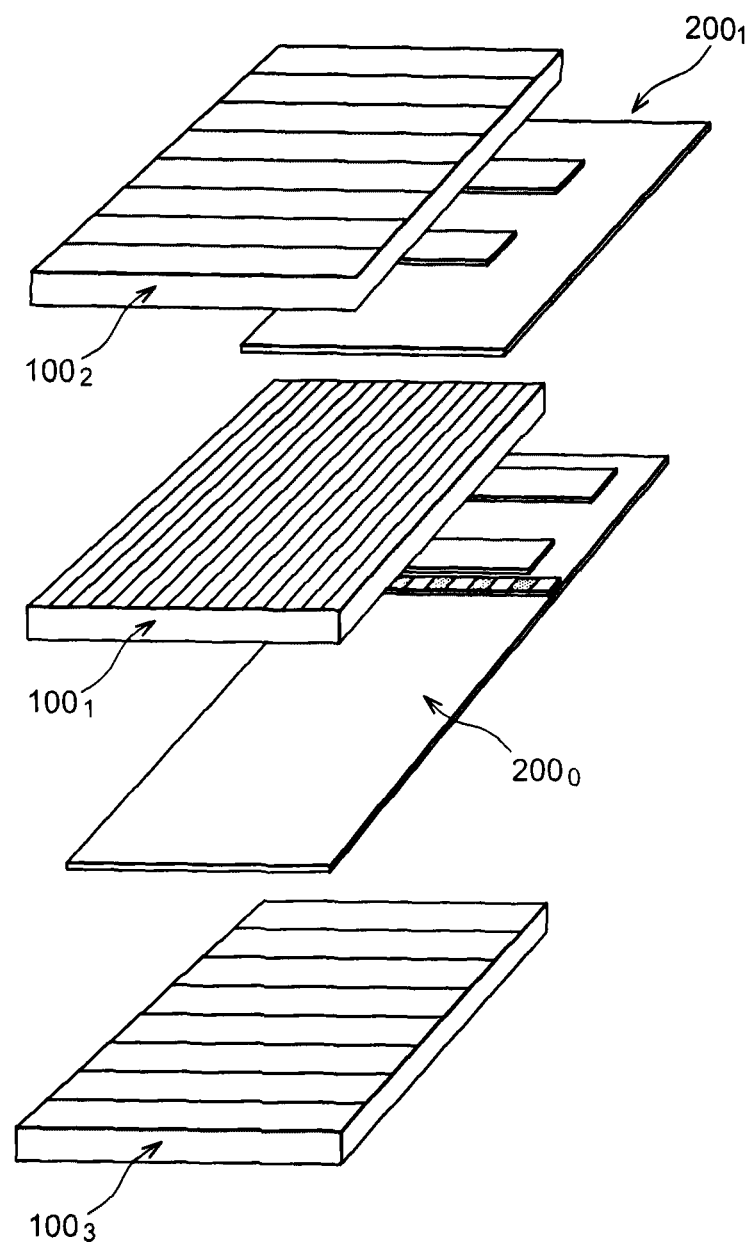
Figure 8:
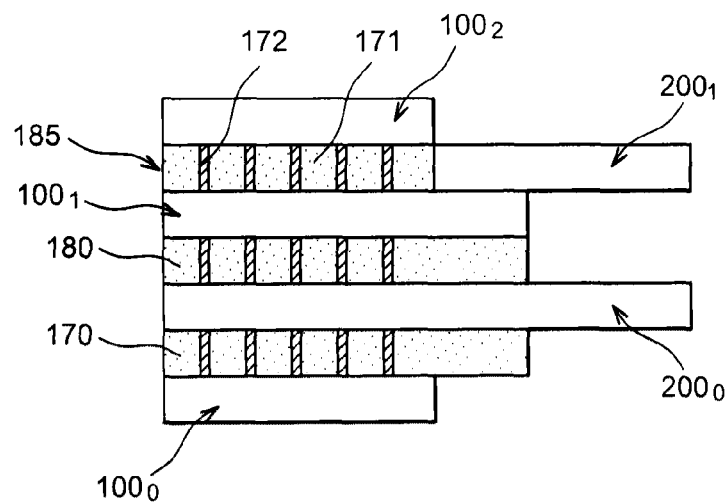
FIG. 8 shows an example of assembly in a radiation detector device according to the invention, of detection blocks and of polarization and signal processing circuits, by using anisotropic conductive adhesive layers.

Examples of arrangements with respect to such a support are given in FIGS. 7A to 7C, while in FIG. 8 is given an example of assembly with this support.

The support $200_1$ is provided with polarization means and is dedicated to a polarization of the electrodes 132, for example anodes, located on a first polarization face of a first detection block $100_1$. This support can comprise means of signal processing, for example in the form of an ASIC; the latter may be dedicated to low-noise processing of an electronic signal or dedicated to the analogical digital conversion. Other means of processing, signal shaping, filtering, threshold triggering, multiplexing, analogical signal summing may also be provided.

The support $200_1$ may be, for example in the form of a printed circuit board, having connections together with at least a power supply circuit or power supply means dedicated to the polarization of electrodes according to a given polarization potential, for example of the order of 0 V, when it is dedicated to a polarization of anodes. The support $200_1$ may also be equipped with one or more circuits for processing signals issued from the electrodes. To implement a polarization and signal processing, support $200_1$ may comprise one or more ASICs (ASIC stands for "Application Specific Integrated Circuit"). A block for transferring the information towards a computer, a block for low-noise processing of the low level analogical electronic signal, RC arrays for the polarization of the detectors may be provided.

The signal processing means may comprise, for example, one or more of the following functions: amplification, formatting and filtering, threshold triggering, path coding having detected an event, multiplexing, analogical signal summation, integration.

Support $200_1$ may also be equipped with connections provided to connect the paths of at least one of its electronic circuit with the electrodes 132 of a first polarization face of the first detection block $100_1$. These connections can have, for example, a distribution similar to those of the electrodes 132 exposed by the end going beyond blocks $100_1$, $100_3$, of same length $L_1$ and be in the form of conductive strips 222 located on either face of the support $200_1$, or possibly on both faces of the support $200_1$. The polarization of the electrodes 132 located on the first polarization face of the second detection block $100_2$ and acting for example as anodes, and the processing of signals issued from these electrodes can be achieved by using means located on the same support $200_1$ or the same means as those which are connected to the electrodes of the first detection block $100_1$, which are located opposite.

So, the support $200_1$ can provide an electric contact with the electrodes 132 of the first detection block $100_1$; the latter are located opposite the electrodes 132 of the second detection block $100_2$, which are of the same kind. Advantageously, the mechanical and electrical contact between the electrodes 132 of the first and second detection blocks, which are of the same kind, is carried out by means of a conductive adhesive. This adhesive may consist of a thin layer of an anisotropic conductive adhesive 185, or of thin thicknesses of an isotropic a conductive adhesive which connect to each other, electrodes 132 of the same kind, belonging to adjacent detection blocks. So, one avoids placing support $200_1$ in the space separating electrodes 132 from two adjacent detection blocks $100_1$ and $100_2$. By providing a conductive adhesive only in the space, the thickness of the latter is reduced, which makes it possible to reduce the dead zone.

In the example of the device of FIGS. 7A to 7C, another support $200_0$ may also comprise polarization means and means for processing signals issued from the electrodes 122, for example from cathodes of a third detection block $100_3$ and from cathodes of the first detection block $100_1$. The polarization means of the other support $200_0$ allow polarizing the electrodes according to another given polarization potential that may be, for example of the order of −1000 V when these means are dedicated to a cathode polarization.

One can reduce the number of the electronic paths which are required for the polarization or/and the acquisition of signals by connecting electrodes of adjacent blocks $100_1$, $100_2$, which are located on polarization faces opposite each other.

When a radiation is emitted, the localization of an interaction with a detection block can be achieved by searching of a coincidence between an anode signal and a cathode signal, together with an appropriate processing.

According to an example of operation of the device, an electronic circuit of the support $200_1$ detects a signal in its third path. This may mean that an interaction has taken place in the voxels of the third anode of the detection block $100_1$ or of the third anode of the second detection block $100_2$. If this information is related with another information from an electronic circuit on another support $200_0$ dedicated to the cathodes of the first detection block $100_1$ and of a third detection block $100_3$, and which indicates a signal on its first path, this means that the interaction is localized in the first detection block $100_1$ at its voxel whose coordinates are (3; 1).

The electrodes 132 located on a first polarization face of the first detection block $100_1$, can be connected to those situated opposite on a first polarization face of the second detection block $100_2$, for example by using a layer of an adhesive 185 having an anisotropic conduction (FIG. 7A); only the electrodes 132 of the first block $100_1$ which is the longest one are then connected electrically to the polarization and processing means of the supports $200_1$.

An adhesive having an anisotropic electrical conductivity comprises, for example conductive metal balls 172 which are embedded in an acrylic adhesive 171, and make it possible to ensure an electrical contact in a single direction.

For example, an anisotropic adhesive can be in the form of an adhesive tape providing conductivity in the direction defined by its thickness and insulating in a parallel plane to its face.

The adhesive layer 185 having an anisotropic conduction can have a thickness ranging, for example between 10 μm and 100 μm, or between 30 to 50 μm.

According to a possible arrangement, given the direction of the electrodes 122, acting, for example as cathodes, to establish a connection between the electrodes 122 of the detection blocks $100_2$ and $100_3$, the other support $200_0$, may be interposed between the first and third detection blocks $100_1$ and $100_3$. The other support $200_0$ can be possibly achieved by a so-called "double-face" technology and comprise conductive areas on its both faces to establish a contact. A layer of anisotropic conductive adhesive 170 can help ensure the contact and the assembly between the electrodes 122 of the third detection block $100_3$ and the support $200_0$, while a layer of anisotropic conductive adhesive 180 can help ensure the contact and the assembly between the electrodes 122 of the first detection block $100_1$ and the support $200_0$. The connection and the assembly between the electrodes 122 of the same kind, of the first and third blocks $100_1$ and $100_3$ are then carried out by providing, between these electrodes, two adhesive layers 180, 170 together with the support $200_0$.

According to one variant, the connection between electrodes 122 of detection blocks located vis-à-vis can be made by using a conductive adhesive material, for example in the form of drops or paths of conductive adhesive on each electrode located on a polarization face of a first detection block before assembly on the polarization face of an adjacent detection block.

Should it be wished to connect two by two an electrode 122 located on a face of a detection block to an electrode 122 of the same kind, located on a face of an adjacent detection block, points of a conductive adhesive which are localized and connect only two electrodes, can be provided and obtained, for example by screen printing.

Figure 9A:
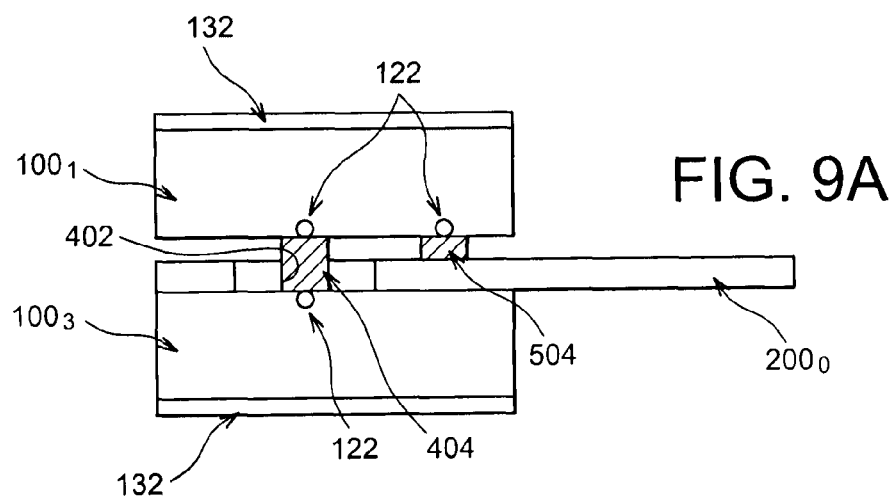
FIGS. 9A to 9B show examples of assembly in a radiation detector device according to the invention, of adjacent detection blocks and a perforated support interposed between these blocks and comprising polarization and signal processing circuits dedicated to the said adjacent detection blocks.
Figure 9B:
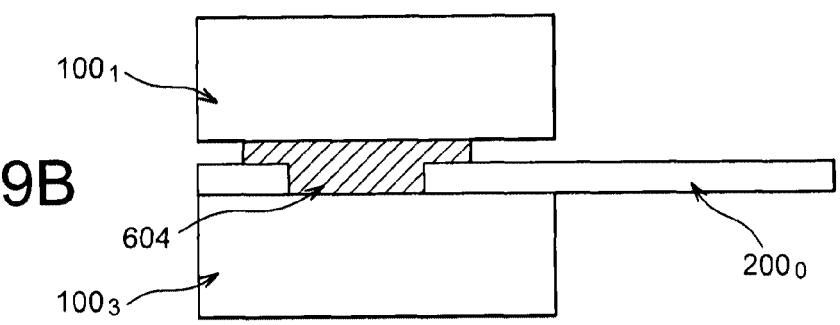

Another example of an arrangement of a radiation detection device according to the invention comprising a plurality of detection elements (such as described for example in connection with FIGS. 3A to 3B), which arrangement makes it possible to reduce the volume separating the electrode 122 belonging to two adjacent detection blocks, is given in FIGS. 9A and 9B.

In such a device, the electrodes 122 of the first detection block $100_1$ are located opposite to electrodes 122 of a third detection block $100_3$ adjacent to the detection block $100_1$.

A support $200_0$ equipped with electrode polarization means and signal processing means is interposed between the detection blocks $100_1$ and $100_3$ and has one or more openings 402.

In each opening 402, a conductive area 404 may be provided in order to establish an electrical connection between an electrode 122 of a detection block $100_1$ and an electrode 122 of the other detection block $100_3$. The conductive area 404 may also allow assembling the detection blocks $100_1$ and $100_3$.

The electrodes 122 of the detection blocks $100_3$ and $100_1$, located opposite each other are connected to one or more electronic circuits of polarization and signal processing of support $200_0$ through one or more conductive areas 504 of the support $200_0$ each in contact with an electrode 122 of a detection block $100_1$ among the adjacent detection blocks $100_3$, $100_1$ (FIG. 9A). It is thus possible to achieve an improved spacing and to reduce the volume separating two polarization faces of adjacent blocks. So, two electrodes of the same kind, belonging to two adjacent detection blocks, and located opposite each other, can be connected by a first adhesive layer 104, the latter being established through an opening provided in support $200_0$ which is located between said adjacent detection blocks $100_1$ and $100_3$. In the example of FIG. 9A, only one of these two electrodes can be electrically connected to support $200_0$ by a conductive layer 504. Conductive layer 504, ensures an electrical connection between an electrode 122 of a first detection block $100_1$; the layer 404 ensures the electrical interconnection between two electrodes 122, of the same kind, belonging to two adjacent detection blocks $100_1$ and $100_3$, which electrodes are located opposite each other.

On the example of FIG. 9B, opening 402 is filled with a conductive area 604 provided in order to establish an electrical connection between the detection block $100_1$ and the other detection block $100_3$. This conductive layer 604 ensures both the connection of the electrodes 122 with the substrate and the interconnection between two electrodes 122, of the same kind, belonging to two adjacent detection blocks $100_1$ and $100_3$, which electrodes are located opposite each other.

In an assembly comprising a plurality of detection blocks, this method of connection between adjacent detection blocks may possibly be provided to connect each pair of adjacent detection blocks.

According to another possibility, an assembly may be provided wherein the connection method described in conjunction with FIGS. 9A to 9B is combined with one or more alternative connection methods such as described above. Thus, the connection method given in connection with FIG. 9A to 9B can be applied for example to connect between each other, a first type of electrodes 122, for example the cathodes of adjacent detection blocks, while the electrodes of a second type, for example the anodes 132 are connected between each other by using another arrangement, for example by means of an anisotropic conductive layer or a conductive adhesive; in that case, only the anodes belonging to the longest detection block are connected to the support having the polarization and detection means.

It should be noted that, according to the invention, at least two electrodes of the same kind, belonging to two adjacent detection blocks, and located opposite each other, are interconnected by a conductive layer. As described above, this conductive layer may be constituted of a thin layer of anisotropic adhesive or by deposits of an adhesive, forming dots or lines.

Figure 10:
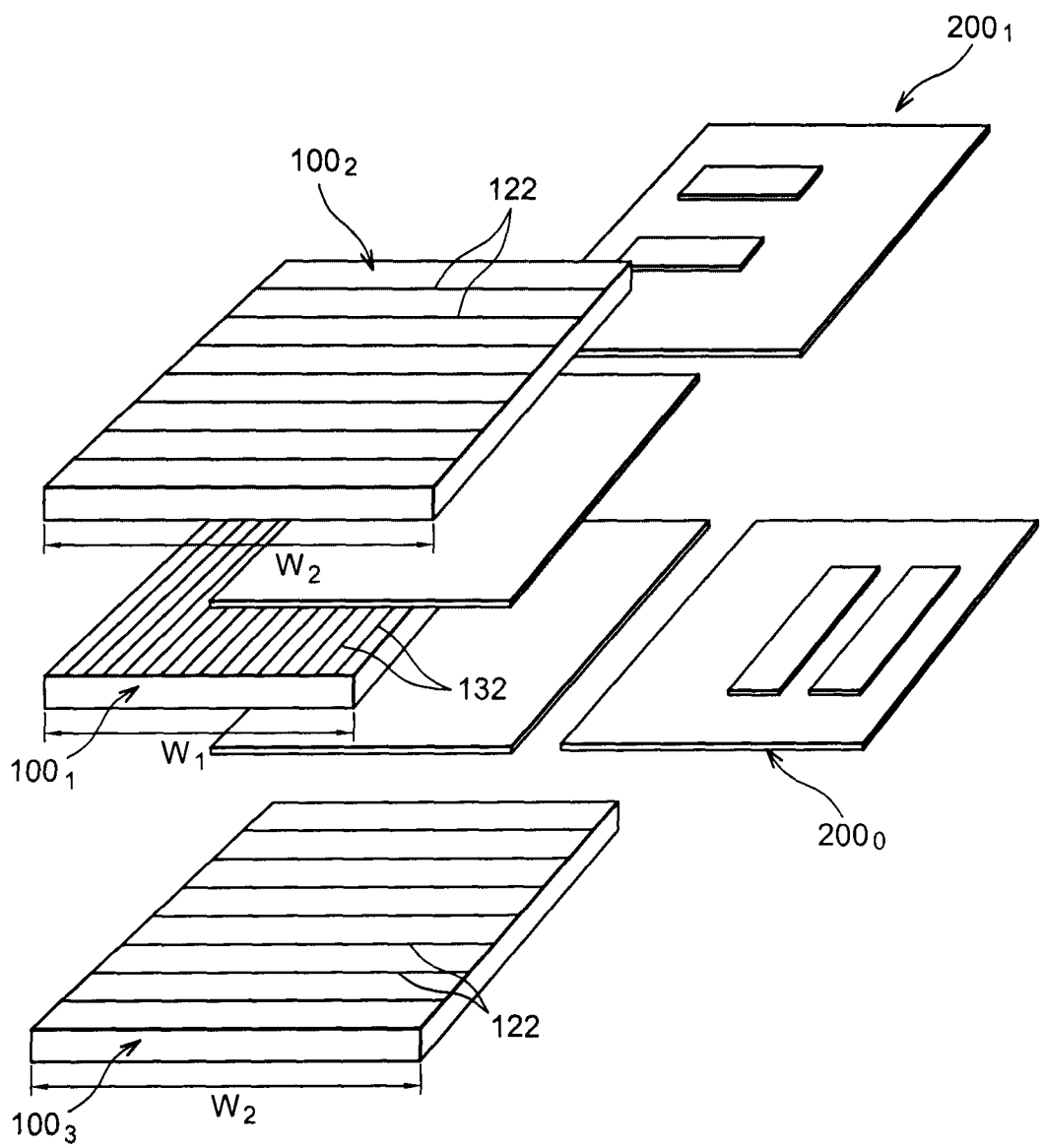
FIG. 10 shows an example of assembly in a radiation detector device according to the invention, having neighbouring detection blocks of different lengths and of different widths.

In FIG. 10 is given an example of an implementation for a detection device comprising adjacent detection blocks $100_3$, $100_1$, and $100_2$, having respective different widths. The first block $100_1$ has a width $W_1$ lower than that of the second block $100_2$, adjacent to the first, the second block $100_2$ having a width $W_2$ such that $W_2 > W_1$.

An assembly comprising blocks having a first width $W_1$ alternating with blocks of a second length $W_2$ such that $W_2 > W_1$ may thus be achieved.

In this case, when the respective detection faces 102 respective of the adjacent blocks $100_3$, $100_1$, $100_2$, are substantially coplanar or located in the same plane, the side faces of the block $100_2$, having a greater width $W_2$, go beyond that of the block $100_1$, having a lesser width $W_1$.

By using this excess, when the blocks $100_3$, $100_1$, $100_2$, are assembled, part of the polarization faces of the blocks $100_3$, $100_2$, having a greater width $W_2$, go beyond, thereby allowing to have an access to the electrodes 122.

Thus, a contacting area is achieved for the polarization means of electrodes 122 or/and means for processing signals generated at these electrodes 122.

Figure 11:
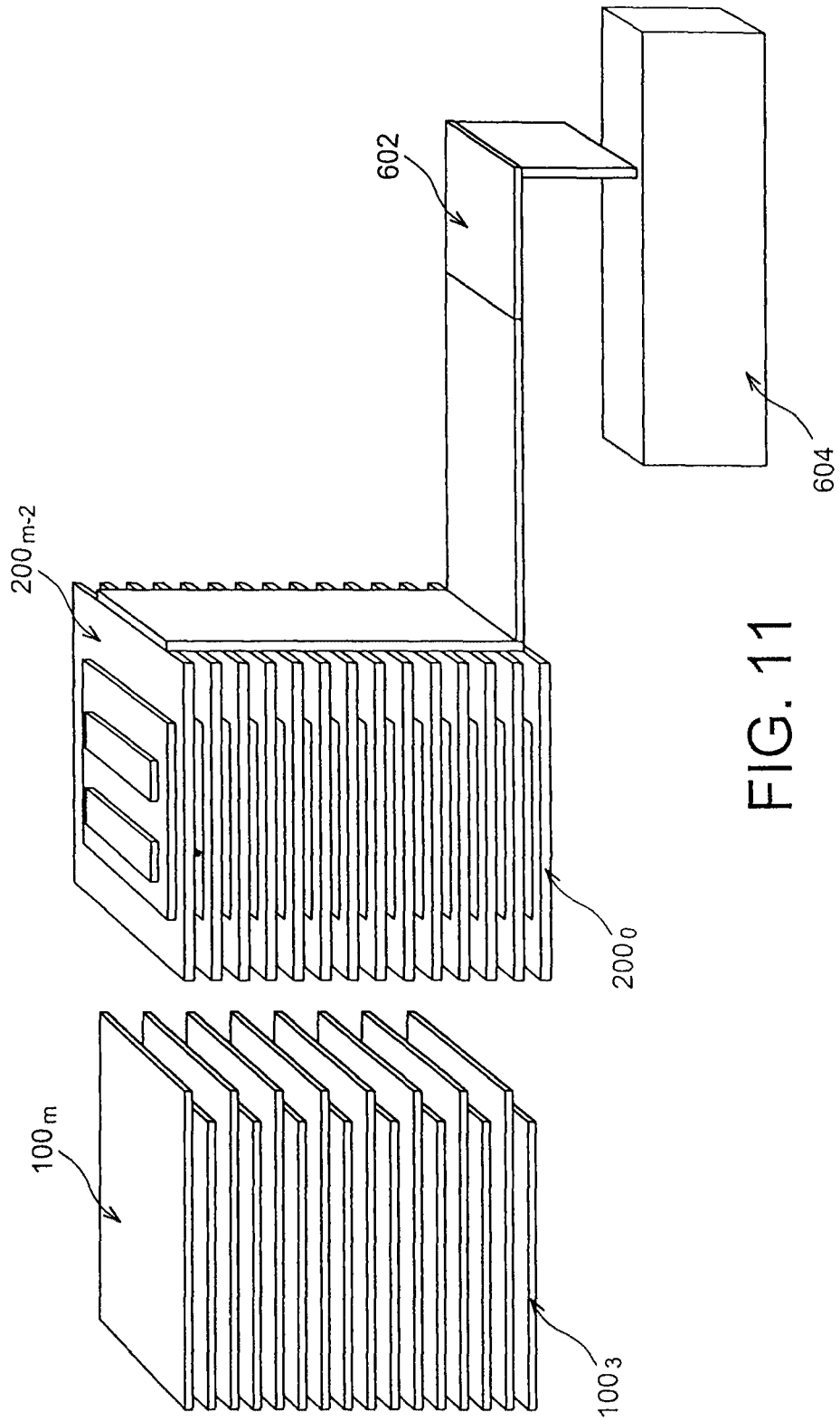
FIG. 11 shows an example of ionizing radiation detection device according to the invention, Identical, similar or equivalent parts of the different Figures bear the same numerical references so as to facilitate the transition from one Figure to another.

In FIG. 11 is given an example of a device for detecting ionizing radiation comprising m detection blocks $100_0$ . . . $100_m$ with m, for example equal to 16, before assembly with a remote electronic device placed in the rear face of the detection blocks. The electronic device has m−2 supports $200_0$ . . . $200_{m-2}$, in a form, for example of integrated circuit boards, each equipped with polarization and signal processing circuits, for example an ASIC circuit having 16 inputs, 16 outputs and a circuit having 16 multiplexed inputs and outputs.

A connection system 602 may be provided to connect these circuits to a processing digital block 604.

A detection device according to the invention may find applications in the medical imaging field and be incorporated for example in a tomography device, for example a positron emission tomography or PET device.

The invention claimed is:

1. A device that detects electromagnetic radiation, comprising:
   an assembly of juxtaposed parallelepipedic semiconductor detection blocks, each detection block including a given length separating a detection face and at least one rear face opposite to the said detection face, a given thickness separating a first polarization face with one or more electrodes and a second polarization face with one or more other electrodes, and a given width, wherein
   the detection blocks include a first detection block and a second detection block that are adjacent, a first polarization face of the second detection block is located opposite of a first polarization face of the first detection block,
   at least one electrode located on the first polarization face of said first detection block is electrically connected to at least one electrode located on the first polarization face of said second block,
   the first detection block is longer than said second detection block or wider than said second detection block, and
   an area of the first polarization face of said first detection block projects beyond the first polarization face of said second detection block so that electrodes located on said area are accessible.

2. The device according to claim 1, wherein the detection blocks comprise, on a first polarization face, electrodes parallel to each other and directed according to a first direction, and on a second polarization face, electrodes parallel and directed according to a second direction, orthogonal to the first direction.

3. The device according to claim 2, wherein the electrodes located on the first polarization face of the first detection block having a same direction as the electrodes of the said first polarization face of the second detection block.

4. The device according to claim 1, wherein the first detection block has a length greater than that of the second detection block and a width lower than that of the second detection block.

5. The device according to claim 4, wherein the electrodes of the first polarization face of the second detection block and of the first polarization face of the first detection block are configured to be brought to a first potential, and the electrodes of the second polarization face of the second detection block and of the second polarization face of the first detection block are configured to be brought to a second potential, different from the first potential.

6. The device according to claim 1, comprising at least two detection blocks electrically connected through an anisotropic conductive layer interposed between these the at least two detection blocks.

7. The device according to claim 1 comprising at least two detection blocks electrically connected through a conductive adhesive or through points of a conductive adhesive.

8. The device according to claim 1, further comprising:
   at least one support disposed on the first detection block and equipped with a signal processor that processes signals issued from electrodes, wherein the signal processor is electrically connected to at least one electrode of the first detection block.

9. The device according to claim 8, wherein a first support is arranged between the first detection block and the second detection block and has at least one opening, an electrical connection between at least one electrode of the first detection block and at least one electrode of the second detection block is established by least one conductor element crossing said at least one opening, and the first support is also electrically connected to at least one electrode of the first detection block or to at least one electrode of the second detection block.

10. The device according to claim 1, wherein the assembly comprises at least a third detection block adjacent to the first detection block, the second polarization face of the first detection block is located opposite a second polarization face of the third detection block, at least one electrode located on the second polarization face of the first block electrically connected to at least one electrode located on the second polarization face of the third detection block.

11. The device according to claim 10, wherein the first detection block has a length greater than that of the third detection block and/or a width lower than that of the third detection block.

12. The device according to claim 10, further comprising:
   at least one support interposed between the first detection block and the third detection block,
   wherein the at least one support is equipped with a signal processor that processes signals issued from electrodes, and the signal processor is electrically connected to at least one electrode of the first detection block and/or of the third detection block.

13. The device according to claim 12, wherein the the at least one support has at least one opening, an electrical connection between at least one electrode of the first detection block and at least one electrode of the second detection block being established by least one conductor element crossing said opening, and the at least one second support is also electrically connected to at least one electrode of the first detection block or at least one electrode of the second detection block.

14. The device according to claim 12, wherein the at least one support and the first detection block electrically connected through a first anisotropic conductive layer or through an interposed conductive adhesive, the at least one support and the third detection block area electrically connected through a second interposed anisotropic conductive layer or through an interposed conductive adhesive.

15. The device according to claim 1, comprising:
a polarization circuit connected to the first polarization face of the first and second detection blocks.

* * * * *